United States Patent
Yamanaka et al.

(10) Patent No.: US 10,385,928 B2
(45) Date of Patent: Aug. 20, 2019

(54) CLUTCH WITH REDUCED LOAD ON EDGES

(71) Applicant: GKN Driveline Japan Ltd., Tochigi, Tochigi (JP)

(72) Inventors: Yasuo Yamanaka, Tochigi (JP); Hideyuki Inose, Tochigi (JP)

(73) Assignee: GKN Driveline Japan Ltd, Tochigi, Tochigi (JP)

( * ) Notice: Subject to any disclaimer, the term of this patent is extended or adjusted under 35 U.S.C. 154(b) by 494 days.

(21) Appl. No.: 15/227,226

(22) Filed: Aug. 3, 2016

(65) Prior Publication Data
US 2016/0341257 A1    Nov. 24, 2016

Related U.S. Application Data

(63) Continuation of application No. PCT/JP2014/053455, filed on Feb. 14, 2014.

(51) Int. Cl.
*F16D 11/14*    (2006.01)
*F16D 11/00*    (2006.01)
(Continued)

(52) U.S. Cl.
CPC .............. *F16D 11/14* (2013.01); *F16D 11/00* (2013.01); *F16D 27/118* (2013.01);
(Continued)

(58) Field of Classification Search
CPC .... F16D 2011/008; F16D 11/04; F16D 11/10; F16D 11/14; F16D 27/118; F16H 48/24; F16H 48/34
(Continued)

(56) References Cited

U.S. PATENT DOCUMENTS 2,384,583 A * 9/1945 Wildhaber .............. F16D 11/14
                                                    192/108
2,443,089 A    6/1946 Wildhaber
(Continued)

FOREIGN PATENT DOCUMENTS

DE    693083 C    7/1940
GB    1095861 A    12/1967
(Continued)

OTHER PUBLICATIONS

Office Action mailed by the European Patent Office dated Aug. 30, 2018 for EP Application No. 14882543.3 (5 pages).
(Continued)

*Primary Examiner* — Richard M Lorence
(74) *Attorney, Agent, or Firm* — Bejin Bieneman PLC

(57) ABSTRACT

A clutch is comprised of a first clutch member including a plurality of first clutch teeth arranged circumferentially around an axis; and a second clutch member including a plurality of second clutch teeth arranged circumferentially around the axis and engageable with the first clutch teeth, each of the second clutch teeth including an end portion internal or external relative to the axis and a pair of side faces facing each other across the end portion, any of the side faces getting in contact with the first clutch teeth when engaged, each of the pair of side faces including a first face being flat and a second face being continuous to the first face and the end portion and having a slope oblique to the first face, wherein one of the first clutch member and the second clutch member is axially movable relative to the other.

5 Claims, 3 Drawing Sheets

(51) Int. Cl.
*F16D 27/118* (2006.01)
*F16H 48/24* (2006.01)
*F16H 48/34* (2012.01)

(52) U.S. Cl.
CPC ........ *F16D 2011/008* (2013.01); *F16H 48/24* (2013.01); *F16H 48/34* (2013.01)

(58) Field of Classification Search
USPC ....................................................... 192/108
See application file for complete search history.

(56) References Cited

U.S. PATENT DOCUMENTS

| | | | |
|---|---|---|---|
| 2,682,760 | A | 7/1954 | IShenk |
| 4,059,026 | A * | 11/1977 | Stritzel ................... F16H 48/08 |
| | | | 192/108 |
| 4,721,194 | A | 1/1988 | Frost |
| 2007/0054771 | A1 | 3/2007 | Fusegi |
| 2009/0181820 | A1 | 7/2009 | Homan |
| 2012/0318629 | A1* | 12/2012 | Lyman ................... F16H 48/142 |
| | | | 192/69.7 |
| 2013/0230352 | A1 | 9/2013 | Goulet et al. |

FOREIGN PATENT DOCUMENTS

| | | |
|---|---|---|
| GB | 1096814 A | 12/1967 |
| JP | S4825144 U1 | 3/1973 |
| JP | S63-195422 A | 8/1988 |
| JP | 200778128 A | 3/2007 |
| JP | 2007092990 A | 4/2007 |
| JP | 2009108878 A | 5/2009 |
| JP | 2013-185676 A | 9/2013 |

OTHER PUBLICATIONS

International Search Report and Written Opinion for PCT/JP2014/053455 dated May 27, 2014 (9 pages).
Extended European Search Report for EP Application No. 14882543.3 dated Oct. 4, 2017 (7 pages).
Official Action dated May 9, 2017 by the Japanese Patent office for JP2015-562639 (6 pages; with English translation).
Chinese Office Action for CN Application No. 201480075127.8 dated Sep. 29, 2017 (13 pages; with English translation).

* cited by examiner

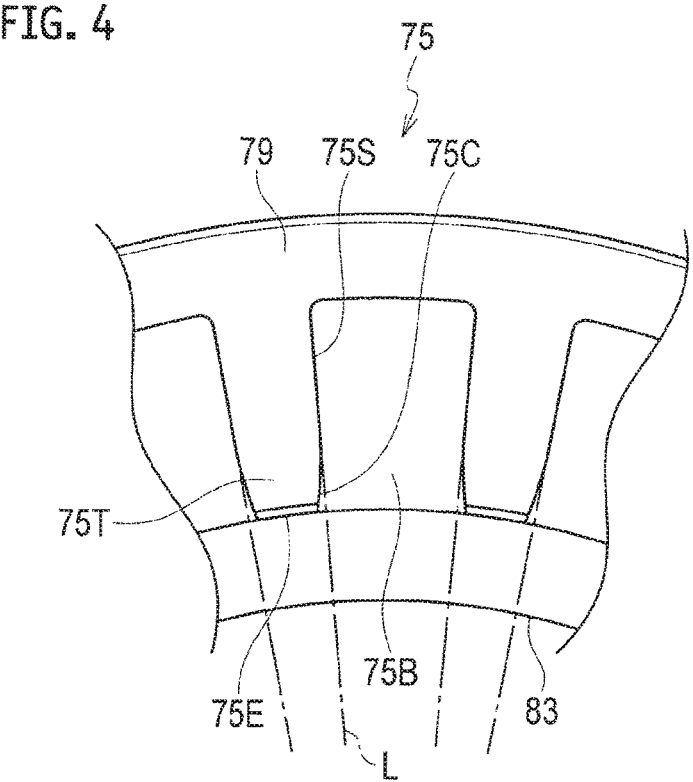
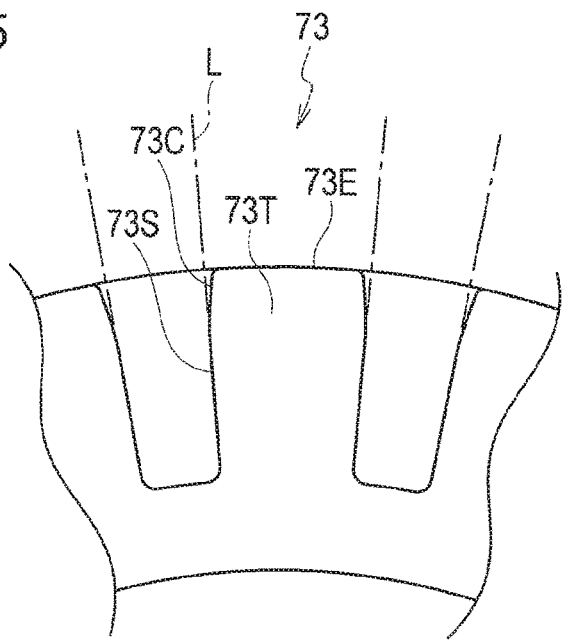

CLUTCH WITH REDUCED LOAD ON EDGES

This application is a continuation Application of PCT International Application No. PCT/JP2014/053455 (filed Feb. 14, 2014), the entire contents of which are incorporated herein by reference.

TECHNICAL FIELD

The disclosure herein relates to a clutch for a rotary machine such as a differential device or a power take-off unit, and in particular to a dog clutch that can reduce load on edges.

BACKGROUND

An automobile employs various rotary machines such as a differential device and a power take-off unit. Some of these rotary machines often have clutches incorporated therein. In a lock-up differential for example, a clutch is incorporated for the purpose of limiting differential motion of the differential gear. Or, a purpose of controlling torque transmission to a power take-off unit or a free-running differential may necessitate incorporation of a clutch.

A clutch is, in a case of a dog clutch, comprised of a pair of clutch members each having clutch teeth. When one of them approaches the other, the clutch becomes connected. When they come apart, the clutch becomes disconnected. An actuator such as a hydraulic device or a solenoid is used to move the clutch member.

Japanese Patent Application Laid-open No. 2007-92990 discloses a related art.

SUMMARY

Clutch members should be finely aligned with a rotation axis respectively but inevitably have some play in order to give them mobility in the axial direction or arisen from any other factor. Such play prevents meshed clutch teeth from establishing uniform contact, which leads to severe stress concentration in edges of the clutch teeth. This, of course, affects durability of the clutch and may shorten its lifetime. The device described below has been devised in light of this problem.

According to an example, a clutch used in combination with a rotary machine rotatable about an axis is comprised of a first clutch member including a plurality of first clutch teeth arranged circumferentially around the axis; and a second clutch member including a plurality of second clutch teeth arranged circumferentially around the axis and engageable with the first clutch teeth, each of the second clutch teeth including an end portion internal or external relative to the axis, and a pair of side faces facing each other across the end portion, any of the side faces being in contact with the first clutch teeth when engaged, each of the pair of side faces including a first face being flat and a second face being continuous to the first face and the end portion and having a slope oblique to the first face, wherein one of the first clutch member and the second clutch member is axially movable relative to the other.

BRIEF DESCRIPTION OF THE DRAWINGS

FIG. 4 is an enlarged plan view of the clutch teeth of the clutch member.

FIG. 5 is an enlarged plan view of clutch teeth of a side gear.

DESCRIPTION

Exemplary embodiments will be described hereinafter with reference to FIGS. 1 through 5.

While a case where a dog clutch is applied to a lock-up differential device of a bevel gear type could exemplify these embodiments, the embodiments are not limited thereby. The embodiments will be readily converted to other applications to rotary machines such as a free-running differential device or a power take-off unit. In addition, the following descriptions are related to an example in which the differential device is applied to axles of a vehicle but the differential device may also be applied to the other shafts such as a propeller shaft. Further, as the distinction between the right and the left is only for descriptive purposes, the embodiments do not depend on the orientation. Still further, inside-out variants may be possible as to some constituents.

Figure 1:
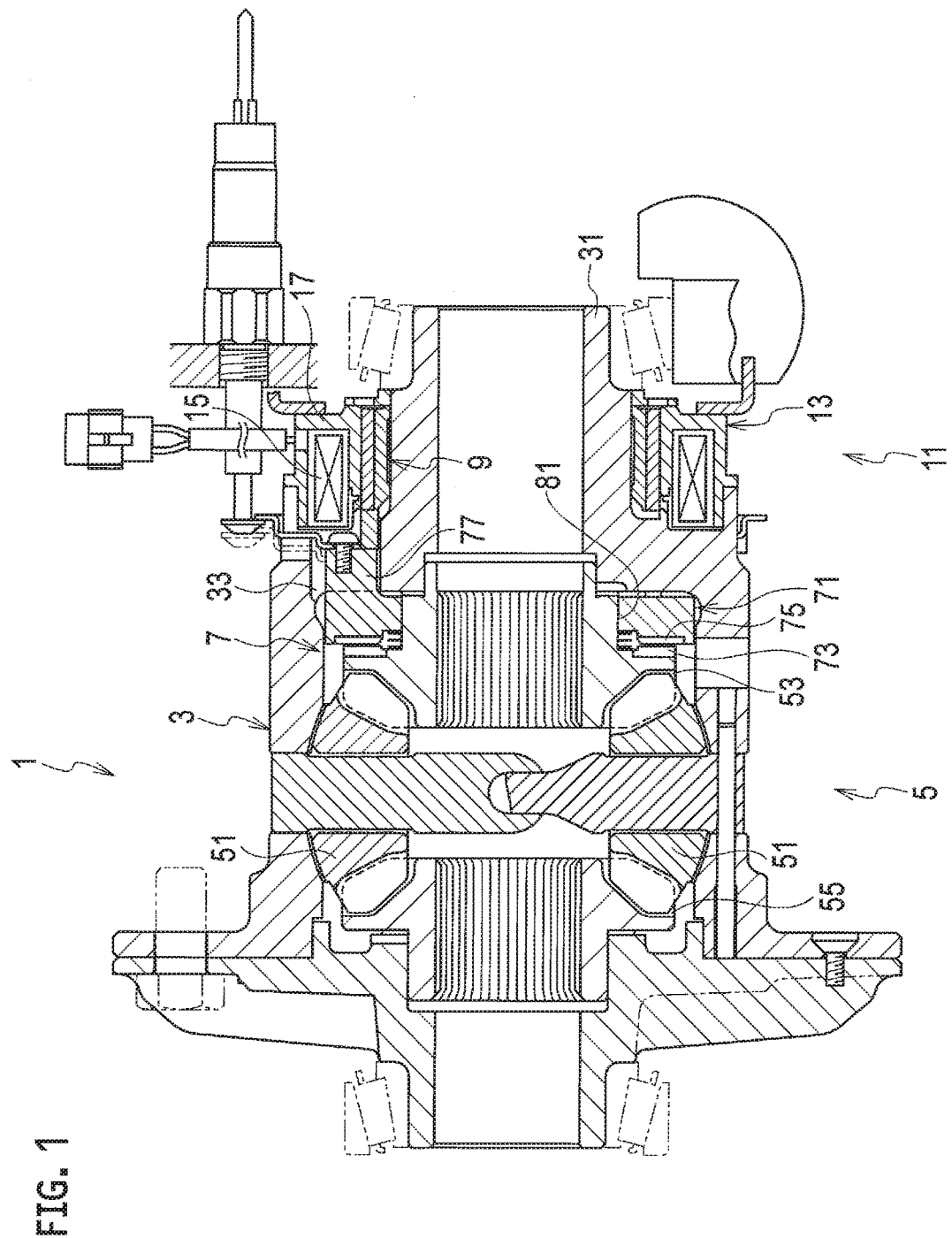
FIG. 1 is a sectional view of a differential device according to an example having a clutch incorporated therein.

Referring to FIG. 1, a differential device 1 is comprised of a differential case 3 rotatable about an axis, a differential gear set 5 housed therein, a clutch 7, and a combination of a plunger 9 and an actuator 11 for driving the clutch 7. The clutch 7 is constituted of a combination of a right side gear (first clutch member) 53 of the differential gear set 5 and a clutch member (second clutch member) 71.

The differential case 3 is constituted of a case main body and a cover body covering an end thereof, in which the differential gear set 5 and the clutch member 71 are housed. The case main body and the cover body respectively have boss portions 31 projecting axially outward, which are rotatably supported by a carrier having bearings interposed therebetween, whereby the differential case 3 is rotatable about its axis. The differential case 3 generally receives torque from an engine and/or motor of the vehicle to rotate, and the differential gear set 5 and the clutch member 71 housed therein rotate along with the differential case 3.

The differential gear set 5 is, in a case of a bevel gear type for example, constituted of a plurality of pinion gears 51, a first side gear 53 and a second side gear 55 both meshing therewith. The pinion gears 51 are input gears receiving the torque from the differential case 3. The side gears 53, 55 are respectively coupled with the right axle and the left axle and differentially distribute the received torque to these axles.

Figure 2:
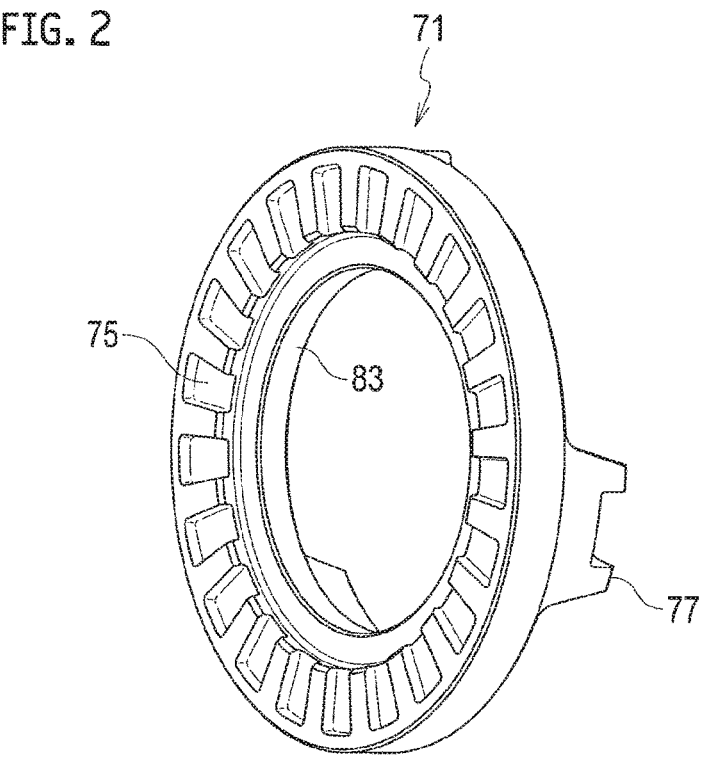
FIG. 2 is a perspective view of a clutch member mainly showing a side having clutch teeth.
Figure 3:
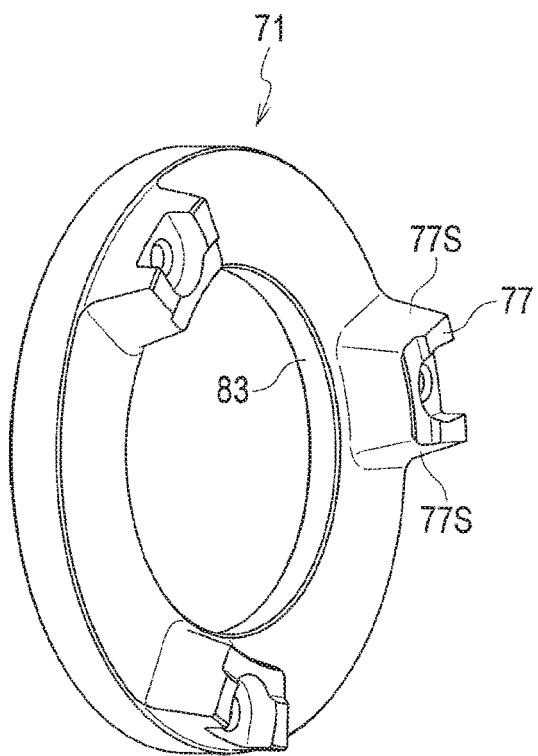
FIG. 3 is another perspective view of the clutch member mainly showing a side having cam projections.

Housed in the differential case 3 is the clutch member 71 opposed to the right side gear 53. Referring to FIGS. 2 and 3 in combination with FIG. 1, the clutch member 71 has a ring-like shape and an internal periphery 83 of this ring slidably fits on a boss portion 81 of the right side gear 53, for example, thereby being axially movable.

The right side gear 53 is comprised of a plurality of first clutch teeth 73 arranged in its circumferential direction on a side opposed to the clutch member 71. The clutch member 71 is comprised of a plurality of second clutch teeth 75 arranged in its circumferential direction on a side opposed to the right side gear 53. The clutch teeth 73, 75 are capable of meshing mutually and, more specifically, the combination of the right side gear 53 and the clutch member 71 forms the clutch 7. The clutch teeth 73, 75 will be described later in more detail.

Mainly referring to FIGS. 1 and 3, the clutch member 71 is comprised of a plurality of projections 77 axially projecting from a side opposite to the side of the second clutch teeth 75. The differential case 3 is comprised of through-holes 33 as corresponding thereto, with which the projections 77 engage, so that the clutch member 71 and the differential case 3 rotate together.

The projections 77 further pass through the through-holes 33 so as to have these tops exposed to the exterior. The plunger 9 is comprised of a plurality of claws as corresponding to the projections 77, which respectively get in contact with the tops of the projections 77. When the actuator 11 drives the plunger 9 along the axis toward the clutch member 71, the claws press the projections 77 to connect the clutch 7. When the plunger 9 moves in its opposite direction, the clutch 7 is disconnected. To promote disconnection, between the right side gear 53 and the clutch member 71, or at any other proper site, an elastic body such as a spring for biasing the clutch member 71 rightward may be interposed.

Mainly referring to FIG. 1, applicable to the actuator 11 is a solenoid 13 for example. Or, a hydraulic device, a pneumatic device, or a combination of a motor and a gear can be applicable instead of the solenoid 13.

The solenoid 13 is in general constituted of an electromagnetic coil 15 and a core 17 for conducting magnetic flux generated by the electromagnetic coil 15 and is symmetric about, and circular around, the axis. The core 17 is anti-rotated relative to a carrier (stationary member), which houses the differential device 1. More specifically, the differential case 3 rotates relative to the anti-rotated solenoid 13.

The core 17 by itself, or a combination of the core 17 and the right side wall of the differential case 3, constitutes a magnetic circuit surrounding the electromagnetic coil 15 but leaving a gap. While the gap is radially inside of the electromagnetic coil 15 in the illustrated example, it may be at the outside.

The plunger 9 slidably fits on the solenoid 13 so as to face the solenoid 13 and also span the gap. The plunger 9, in addition, preferably slidably fits on and is supported by the boss portion 31 of the differential case 3. The plunger 9, at least a side thereof opposed to the gap, is formed of a magnetic material. The magnetic flux generated by the electromagnetic coil 15, mainly, does not leap over the gap but flows around the gap through the plunger 9, and this magnetic flux drives the plunger 9 along the axis.

As described above, because the plunger 9 abuts the projections 77 of the clutch member 71, the actuator 11 can, in exciting the electromagnetic coil 15, drive the clutch member 71 to connect the clutch 7. When the clutch is connected, because the clutch member 71 inherently rotates along with the differential case 3, the right side gear 53 is also disabled from rotating relative to the differential case 3. Consequently, differential motion between the side gears 53, 55 is limited. The differential device 1 then comes into a lock-up state.

Referring to FIG. 3 in combination with FIG. 1, in order to assist the axial force for pressing the clutch member 71 toward the right side gear 53, side faces 77S of the projections 77 may be respectively oblique relative to the circumferential direction. Side faces of the through-holes 33 may be also respectively oblique relative to the circumferential direction as corresponding to the side faces 77S of the projections 77. These side faces butting against each other operate as a cam for converting part of the torque on the differential case 3 into an axial force, thereby pressing the clutch member 71 toward the right side gear 53. Therefore, even if the output power of the actuator 11 is relatively limited, sufficient force can be applied to the clutch 7 for retaining its connection.

More detailed descriptions about the clutch teeth 73, 75 will be given next.

Referring to FIG. 4 in combination with FIGS. 1 and 2, in the clutch member 71 (second clutch member), the face opposed to the right side gear 53 is perpendicular to the axis of the clutch member 71. A plurality of grooves, arranged at even intervals in the circumferential direction, is formed on this face and each of these grooves is so structured as to receive each clutch tooth 73 of the right side gear (first clutch member) 53 independently. Formation of these grooves may be executed by grooving by forging or machining, or by any other suitable method.

Respective parts, each between adjacent grooves, axially projecting from bottoms (tooth roots) 75B of the respective grooves, constitute the plurality of second clutch teeth 75. The radially external part compared with the second clutch teeth 75 is left without forming grooves to constitute a single external peripheral wall 79. The external peripheral wall 79 connects radially external ends of the plural clutch teeth 75 together, thereby reinforcing the second clutch teeth 75. Although tooth top faces 75T of the second clutch teeth 75 and the external peripheral wall 79 may form a tiered structure, they may be instead formed to constitute a single flat face as shown in FIG. 4.

Each second clutch tooth 75 tapers off toward the axial center and ends at an internal end portion 75E along a circumferential surface around the axial center. A pair of side faces 75S that face away from each other and have the end portion 75E interposed therebetween is formed to be flat over its considerable part. These flat surfaces are parallel with proper planes L which are for example planes parallel with the axial center or radial planes passing through the axial center. When the clutch teeth 73, 75 are in mesh, one of the pair of side faces 75S gets in contact with the first clutch teeth 73, thereby limiting rotation of the right side gear (first clutch member) 53.

Each side face 75S is comprised of a crown face 75C that lies between the flat face and the end portion 75E and has a slope oblique to the flat face. The slope is so directed as to taper the second clutch tooth 75 toward the end portion 75E. The slope is of course greater than zero but an excessive slope gives rise to an excessive load on the flat face. The slope is thus from ½ to ¹⁄₁₀₀₀₀ for example, or from ¹⁄₁₀₀ to ¹⁄₁₀₀₀₀. Alternatively, the crown face 75C may not be flat but a curved face continuous to and gradually coming off from the flat face.

Each groove is, at its radially external side, closed by the external peripheral wall 79 but is opened radially inwardly. This promotes expulsion of lubricant flowing onto the tooth root 75B, thereby having the advantage of preventing the clutch 7 from sticking.

Referring to FIG. 5 in combination with FIG. 1, in the right side gear (first clutch member) 53, a face opposed to the clutch member (second clutch member) 71 is perpendicular to the axis of the right side gear 53. Formed thereon is a plurality of grooves, arranged at even intervals in the circumferential direction, axially receding from the face, each of which is so structured so as to receive each second clutch tooth 75 independently. These grooves may be also formed by grooving by forging or machining, or by any other proper method.

Respective parts, each between adjacent grooves, axially projecting from tooth roots of the respective grooves constitute the plurality of first clutch teeth 73.

Each first clutch tooth 73 grows broader toward a direction opposite to the axial center and ends at an external end portion 73E along a circumferential surface around the axial center. A pair of side faces 73S that face each other across the end portion 73E is formed to be flat over its considerable part. These flat surfaces are parallel with proper planes L which are for example planes parallel with the axial center or radial planes passing through the axial center. One of the pair of side faces 73S gets in contact with the side faces 75S of the second clutch teeth 75.

Each side face 73S may also comprise a crown face 73C having a slope oblique to the flat face. The slope is from $1/2$ to $1/10000$ for example, or from $1/100$ to $1/10000$. Alternatively, the crown face 73C may also be a curved face continuous to and gradually coming off from the flat face.

Each groove is opened outwardly and therefore promotes expulsion of lubricant, thereby having the advantage of preventing the clutch 7 from sticking.

As a pair of clutch members has some play in radial directions, its clutch teeth may fail to establish uniform contact and therefore create considerable stress concentration in edges of the clutch teeth. According to studies by the present inventors, stress generated by the play is not uniform throughout the total length of the clutch teeth but is more notable around the internal ends or the external ends of the clutch teeth. In the present embodiment, as these parts are made to be crown faces, stress is relieved. As the slopes of the crown faces are moderate, excessive stress would not be generated around the center of the clutch teeth. No matter how the clutch members are misaligned, stress generated in the clutch teeth is made uniform throughout the total length thereof. More specifically, such a structure has an advantage to lengthen lifetime of the clutch teeth 73, 75 and improve durability in severe usage environments.

The first clutch teeth and the second clutch teeth are respectively reinforced by the peripheral walls. This has an advantage to further lengthen a lifetime of the clutch teeth 73, 75 and improve durability in severe usage environments.

Clutch members are on the one hand among members at risk of breaking in differential devices but at the same time are difficult to detach them once incorporated in differential devices. In practical use, when a clutch member breaks, the whole of the differential device often needs to be replaced. Therefore lifetime or durability of the clutch member governs a lifetime or durability of the whole of the differential device. The present embodiment lengthens lifetime of the member in question and improves durability thereof, thereby contributing to lengthen the lifetime and the durability of the whole of the differential device.

Although the above descriptions exemplify the lock-up differential device, other rotary machines such as power take-off units or axle disconnects could enjoy the same or similar effects.

Although certain embodiments have been described above, modifications and variations of the embodiments described above will occur to those skilled in the art, in light of the above teachings.

The invention claimed is:

1. A clutch for use in combination with a rotary machine rotatable about an axis, comprising:
   a first clutch member including a plurality of first clutch teeth arranged circumferentially around the axis; and
   a second clutch member including a plurality of second clutch teeth arranged circumferentially around the axis and engageable with the first clutch teeth, each of the second clutch teeth including an end portion radially internal or radially external relative to the axis and a pair of side faces facing away from each other and having the end portion interposed between the pair, any of the side faces contacting the first clutch teeth when engaged, each of the pair of side faces including a first face being flat and a second face being continuous to the first face and the end portion, and having a slope oblique to the first face in a range from $1/100$ to $1/10000$,
   wherein one of the first clutch member and the second clutch member is axially movable relative to the other.

2. The clutch of claim 1, wherein the slopes are so directed as to taper the second clutch teeth toward the end portions.

3. The clutch of claim 1, wherein the second face comprises a curved face.

4. The clutch of claim 1 wherein the first face is parallel with a radial plane centered on the axis.

5. The clutch of claim 1, wherein a peripheral wall connects radially external ends of the second clutch teeth.

* * * * *